United States Patent [19]

Glover et al.

[11] Patent Number: 4,950,344

[45] Date of Patent: Aug. 21, 1990

[54] METHOD OF MANUFACTURING MULTIPLE-PANE SEALED GLAZING UNITS

[75] Inventors: Michael Glover; Gerhard Reichert, both of Ottawa, Canada

[73] Assignee: Lauren Manufacturing Company, New Philadelphia, Ohio

[21] Appl. No.: 280,154

[22] Filed: Dec. 5, 1988

[51] Int. Cl.[5] ........................ C03C 27/06; B32B 17/10

[52] U.S. Cl. ........................ 156/109; 52/304; 52/788; 156/99; 156/104; 156/107; 156/275.3; 156/275.5; 156/292; 428/34

[58] Field of Search ........................ 52/172, 304, 788; 156/99, 104, 107, 109, 275.3, 275.5, 292; 428/34

[56] References Cited

U.S. PATENT DOCUMENTS

| | | | |
|---|---|---|---|
| 49,167 | 8/1865 | Stetson . | |
| 3,758,996 | 9/1973 | Bowser . | |
| 3,791,910 | 2/1974 | Bowser . | |
| 4,193,236 | 3/1980 | Mazzoni et al. | 428/34 X |
| 4,205,104 | 5/1980 | Chenel . | |
| 4,226,063 | 10/1980 | Chenel . | |
| 4,335,166 | 6/1982 | Lizardo et al. | 156/109 X |
| 4,622,249 | 11/1986 | Bowser | 156/109 X |
| 4,808,452 | 5/1988 | McShane | 156/109 X |

*Primary Examiner*—Robert A. Dawson
*Assistant Examiner*—James J. Engel, Jr.
*Attorney, Agent, or Firm*—Wenderoth, Lind & Ponack

[57] ABSTRACT

A method of manufacturing a multiple-pane sealed glazing unit wherein a first glazing pane is spaced from a second pane by a spacer, which is located around the periphery of the panes, and providing a UV-curable adhesive to connect at least part of the spacer and at least part of one pane. A thin layer of the UV-curable adhesive is applied to the panes or to the spacer and at a selected time in the operation of joining the spacer and the panes, the thin layer of adhesive is exposed to high intensity UV light so that the adhesive layer is at least partially cured.

14 Claims, 3 Drawing Sheets

METHOD OF MANUFACTURING MULTIPLE-PANE SEALED GLAZING UNITS

BACKGROUND OF THE INVENTION

1. Field of the Invention.

The present invention relates generally to methods of manufacturing multiple-pane sealed glazing units and particularly to methods of manufacturing multiple-pane sealed glazing units having an insulating, flexible spacing-and-sealing assembly.

2. Description of the Prior Art

Sealed glazing units generally consist of two or more parallel sheets of glass which are spaced apart from each other and which have the space between the panes sealed along the peripheries of the panes to enclose an air space between them. Spacer bars are placed along the periphery of the space between the two panes and these spacer bars are typically long hollow perforated-metal sections, usually made from an aluminum alloy and fabricated either in the form of an extrusion or by rolling from flat-strip material. The hollow interior of the spacer contains desiccant material which is used to adsorb any residual moisture that may be in the enclosed air and to remove and additional moisture that may enter in the sealed unit air and to remove any additional moisture that may enter in the sealed unit over of a period of time. Typically, the spacers are assembled into a rectangular frame using corner keys. To fabricate the sealed glazing unit, the outward-facing channel between the spacer and glazing sheets is filled with either a thermosetting sealant such as polysulphide, silicone and polyurethane or a thermoplastic sealant such as butyl. There are drawbacks to both types of sealants.

One drawback with thermosetting sealants is that they are generally more permeable to gas and moisture vapour than the thermoplastic sealants. A second drawback is that thermosetting sealants must be cured before the units can be shipped and unless the curing process is specifically accelerated by heat, the units must be stored for at least a few hours before shipping. A third drawback is that during the curing process, thermosetting sealants typically outgas chemical vapours which may condense on the glazing sheets unless special measures are taken to adsorb the solvent vapours. This problem of outgassing is a particular concern for sealed units incorporating low-emissivity(low-e) coatings as the condensed chemical vapours may damage the sensitive optical thin-film coatings.

There are different problems with thermoplastic sealants. One drawback is that thermoplastic sealants do not typically form a chemical or structural bond with the glass and as a result, there are potential problems of spacer bar migration, cold creep and poor peel adhesion at cold temperatures. A second problem is that because the thermoplastic sealant rapidly cools down after extrusion from the hot-melt gun, the bonding process is almost instantaneous and cannot easily be controlled. A third drawback is that during production of the sealed units, the sealant gunning pressure of the thermoplastic sealant is difficult to control and special measures must be taken to prevent the spacer frame and glazing sheets from shifting in position.

One way of overcoming these drawbacks with both thermosetting and thermoplastic sealants is to combine both types of sealants in a dual-seal design. For a conventional dual-seal design, there is an inner thermoplastic seal which functions as the prime moisture vapour and gas barrier seal and an outer thermosetting seal which functions as the structural adhesive seal. Typically, the production method for dual-seal units involves first laying down the inner seal which is a bead of polyisobutylene sealant on to the sides of the spacer adjacent to the glass sheets. The spacer frame is then placed between the panes and heat and/or pressure is applied to ensure that the polyisobutylene bead is compressed and fully wets out onto the surface of the glass. For the second outer structural seal, a thermosetting sealant such as silicone, polyurethane or polysulphide is used and is applied in the outward-facing perimeter channel between the two glass sheets. Dual-seal designs are commonly used for automated production lines where the inner seal also functions as a temporary adhesive to hold the glass sheets in position during the production process while the outer sealant cures. Dual-seal designs also potentially simplify the production process for gas-filling sealed units as the units can be gas-filled prior to the application of the outer sealant.

With a conventional edge seal design, there is significant perimeter heat loss through the conductive metal spacer. To improve the energy efficiency of the glazing unit, various efforts have been made in the past to fabricate the spacer from low-conductive plastic materials. However, the use of a plastic spacer accentuates technical problems relating to the integrity of the edge seal and also complicates the production process of the sealed units. As a result of these technical problems, none of these prior efforts to develop an insulating spacer has as yet been successfully commericalised in North America. In particular, none of the insulating spacers is suitable for flush glazing or structural glazing applications where durable but permeable silicone sealant is used to structurally bond the exterior glazing to the interior glazing and the interior glazing to the building structure. A further concern with plastic spacers is the problem of outgassing which for high thermal performance sealed units is compounded by the need to use only 3A molecular-sieve material in order to avoid the problem of low-temperature gas adsorption by larger-pore desiccant material.

Specific issues and problems raised by the prior art are reviewed below with specific emphasis on methods of manufacturing multiple-glazed sealed units with an insulating, flexible spacing-and-sealing assembly.

U.S. Pat. No. 3,758,996 issued to Bowser describes the addition of desiccant material as a fill to a flexible but solid plastic spacer strip. The plastic spacer strip is backed by a layer of moisture-resistant sealant typically thermoplastic butyl which extends across the spacer from the peripheral edge of one sheet of glazing to the peripheral edge of the other. The plastic spacer strip may be adhered to the glazing sheets with a cureable rubber adhesive but the spacer must be held in position until the adhesive is cured and this slows down and complicates the production process.

U.S. Pat. No. 4,193,236 issued to Mazzoni et al describes the use of separate adhesive cleats to prevent spacer bar migration in units where hot-melt butyl is used as the outer sealant. As with the use of conventional thermosetting sealants, one drawback of the cleat system is that there is a delay before the sealant cleats are cured and the glazing sheets are firmly held in position.

U.S. Pat. Nos. 4,226,063 and 4,205,104 issued to Chenel describes the use of a flexible dual-seal, spacing-and-sealing assembly comprising silicone sealant as the outer structural seal and desiccant-filled butyl sealant as the inner moisture vapour and gas seal. A major drawback of this type of edge seal design is that because the desiccant fill is contained within the low-permeable butyl sealant, moisture vapour is removed very slowly from the airspace.

U.S. Pat. No. 4,662,249 issued to Bowser overcomes the problem of slow moisture-vapour removal by reversing the two sealant materials so that the hot-melt butyl sealant is the outer moisture vapour and gas seal and desiccant-filled silicone sealant is the inner structural adhesive seal. A major drawback of this reverse dual-seal design is that very complex production equipment is required to hold the glazing sheets in position while the inner sealant cures. An additional problem is that a large amount of chemical vapours are released while the inner silicone sealant cures and this outgassing cannot escape and may condense on the glass sheets. As previously explained where a low-e coating is incorporated in the sealed-unit, these condensed chemical vapours can potentially damage the sensitive coating. A further concern is that the addition of the desiccant-fill material reduces the adhesive strength of the structural bond between the spacer and the glazing sheets.

U.S. Pat. No. 4,335,166 issued to Lizardo et al describes a method of manufacturing a sealed glazing unit incorporating a heat-shrinkable plastic film located between two outer glass sheets and which is typically surface coated with a low-e coating. The flexible film is supported between two spacers and is held in position by the outer sealant which is typically polyurethane sealant. One concern is that over time the sealant material may creep and because the spacers are not structurally bonded to the glazing layers, the spacers may migrate inwards creating wrinkles in the flexible film.

The problem of perimeter heat loss has been addressed by prior work carried out by the inventors and has involved the development of a resilient spacing-and-sealing assembly consisting of a flexible foam insulating inner spacer and a low-permeable outer sealant. The inner spacer is typically backed by a high-performance vapour and gas barrier film and is made from moisture-permeable flexible or semi-rigid foam which contains a high percentage weight of desiccant-fill material. In fabricating the sealed unit, the flexible edge strip is laid down around the perimeter of the glazing sheets and is held in place by preapplied, pressure-sensitive adhesive on the spacer sides.

To a large extent, this use of the pressure sensitive adhesive on the spacer sides minimizes the traditional drawbacks of using thermoplastic sealants. However, conventional pressure sensitive adhesives do not form a strong chemical bond with the glass and as a result, there are possible long term durability problems because the glazing sheets may not remain structurally held together. Also, because there is no permanent structural bond, the flexible spacer-and-sealing assembly cannot be used for structural glazing applications.

SUMMARY

The present invention provides in a method of manufacturing a multiple-pane sealed glazing unit wherein a first glazing pane is spaced from a second pane by a spacer which is located around the periphery of the glazing panes; the improvement comprising providing an ultra-violet(UV)-curable adhesive to connect at least part of the spacer and at least part of the pane; and at a selected time, exposing the UV-curable adhesive to high intensity UV-light to rapidly cure the adhesive.

In the production of sealed glazing units, there are two main advantages in using a UV-curable adhesives. First, the use of the UV-curable adhesive provides an almost instant structural adhesive bond between the spacer and the glazing units. Second, the UV-cure process is controllable and the manufacturer can select when to initiate the curing process.

These advantages are particularly important for the production of reverse-dual seal sealed units incorporating a flexible insulating desiccant-filled spacer strip which is structurally adhered to the glazing panes with a UV-curable adhesive. For this application, the adhesive bond between the interfacing surfaces is typically characterized by a tensile strength of at least 20 psi. Preferred materials for the UV-curable adhesive include: silicone, acrylic, and epoxy. Preferred materials for the spacer strip include silicone or acrylic foam sponge.

The UV-curable adhesive may be applied to the flexible spacer strip in different ways.

One option is to preapply a thin-strip of UV-curable adhesive on oppostite sides of the spacers and as the spacer is laid down around the perimeter of the first glazing sheet to at least partially cure the adhesive through exposure to a small "pencil" source of high intensity UV light so that the spacer is held in position. After the second glazing pane is matched to the first glazing pane, the UV-curable adhesive on both sides of the spacer is fully cured using once again high intensity UV light.

A second option is to apply a thin strip of UV-curable adhesive around the perimeter of the glazing panes. As the spacer is laid down on the first glazing pane, the UV-curable adhesive in mutual contact with the spacer is exposed to high intensity UV light so that the adhesive in contact with the spacer is at least partially cured. As with the first option, after the second glazing is matched to the first glazing pane, the UV-curable adhesive is then fully cured.

A third option is to assemble the sealed unit using pressure sensitive adhesive/sealant to temporarily hold the spacer in position. A bead of UV-curable adhesive is then applied, continuosly or as cleats, at the junctions between the spacer and the glazing panes and the adhesive rapidly cured by exposure to high intensity UV light. The advantages of this approach are that the UV-cure equipment is aimplified and the UV curing can be carried out off-line.

A fourth option is to assemble the sealed unit using a combination of pressure sensitive adhesive/sealant and UV-curable adhesive on opposite sides of the spacer. The thin strip or bead of pressure sensitive adhesive/-sealant is typically located on the side of the spacer adjacent to the air space and this has the advantage that the sealant prevents any outgassing from the UV-curable adhesive from directly entering the sealed-unit airspace.

For the production of reverse dual-seal units, the spacer is typically located inward of the edges of the glazing panes, thereby creating an outwardly-facing perimeter channel between the panes. After the spacer is adhered to the panes through exposure to high intensity UV light, the outward-facing perimeter channel is then filled with a low-permeable sealant which is typically a hot-melt thermoplastic butyl sealant.

The main advantages of the UV-cure process for the production of reverse dual-seal glazing units, include:

(i) The fast UV-cure process allows the flexible spacer strip to be instantly held in position as it is laid down on the glazing sheet.

(ii) The process of applying the hot-melt sealant is simplified because following the UV-cure process, the spacer and glazing sheets are firmly held in position.

(iii) The UV-cure process can provide a fully-wetted bond and this allows for gas-filling the sealed unit prior to the application of the outer hot-melt butyl sealant.

(iv) Compared to the forementioned reverse dual-seal design described in U.S. Pat. No. 4,662,249, only thin films or beads of adhesive are required to adhere the spacer to the glazing sheets and so there is a substantial reduction in the amount of chemical gases given off. This minimal amount of outgassing can either be removed as part of the gas-filling process or alternatively prevented from entering the sealed airspaced by a bead of pressure-sensitive adhesive/sealant on the spacer side. With either of these two approaches, any solvent gases possibly given off while the adhesive cures are not trapped within the sealed airspace because the inner structural adhesive can be fully cured prior to the application of the outer hot-melt butyl sealant. Consequently, it is feasible depending on the type of UV-cured adhesive used, to incorporate 100 percent 3A molecular-sieve, disiccant-fill within the insulating spacer strip so the problem of low-temperature gas adsorption by larger-pore desiccant is avoided.

One specialized application of the reverse dual-seal design is for structural glazing applications. For this application, the adhesive between the spacer and glazing panes should be characterized by a tensile strength of at least 60 psi and the preferred adhesive is a UV-curable silicone adhesive. The preferred material for the spacer is flexible desiccant-filled silicone foam or solid silicone. To enhance the tensile-strength properties of the silicone spacer, the spacer is reinforced with 20 to 50 percent by weight of molecular-sieve desiccant fill material.

A second specialized application of the reverse dual-seal is for sealed-units incorporating flexible heat-shrinkable plastic films where the spacers are structurally adhered to the glazing sheets using UV-curable adhesives. The flexible film may also be held in place by beads of UV-curable adhesive applied at the junctions between the film and the spacers. The advantage is that the flexible film is permanently held in position by the spacers and this allows for the use of a low-permeable, thermoplastic outer sealant.

BRIEF DESCRIPTION OF DRAWINGS

The following is a description by way of example of certain embodiments of the present invention, reference being made to the accompanying drawings, in which.

DETAILED DESCRIPTION OF DRAWINGS

Figure 1:
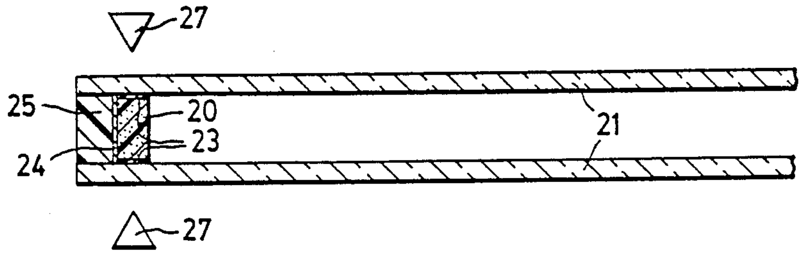
FIG. 1 shows a cross section through the edge seal of a double-glazed unit with UV-curable adhesive on the spacer sides.

Referring to the drawings, FIG. 1 shows a cross-section of a double-glazed sealed unit incorporating a spacer 20 which is permanently bonded to the glazing sheets 21 using a structural UV-curable adhesive 23 which is cured through exposure to high-intensity UV light 27. The spacer 20 can be made from various materials and in different profiles and shapes, including: metal or plastic materials; thermoplastic or theremosetting plastic materials; rigid or flexible materials, and hollow, foam or solid profiles. As illustrated in FIG. 1, the preferred spacer design is a rectangular cross-section of flexible silicone or acrylic foam material which is filled with molecular-sieve desiccant material and backed with a vapour barrier 24. In the production of a sealed glazing unit, the spacer 20 is backed with a low-permeable, outer sealant 25.

The improved sealed-unit production method involves first applying a thin layer of UV-curable adhesive 23 to the spacer 20 (See FIG. 2) or to the glazing sheets 21 (See FIG. 3). The adhesive 23 is rapidly cured through exposure to high-intensity UV light typically in the range of 200 nm to 450 nm. The UV light source is located on the opposite side of the glazing sheet to the spacer 20. Although glass somewhat reduces UV light transmission, sufficient light is transmitted to rapidly cure the adhesive. The cure time of the adhesive varies depending on a number of factors including: location of lamp, light intensity, depth of adhesive layer and supplementary cure mechanism. The UV-cure process allows the spacer to be almost instantly structurally adhered to the glazing panes. To provide an adequate adhesive bond to ensure the long-term integrity of the edge seal, the adhesive bond between the spacer and the glazing panes should be characterized by a tensile strength of at least 20 psi.

Various materials and types of UV-curable adhesives can be used. Based on experiments with a silicone foam spacer, one suitable adhesive is Loctite UV/acetoxy curing silicone, Nuva-Sil TM 83 or the UV/methoxy curing silicone Nuva-Sil TM 84. For the Nuva-Sil 83, a satisfactory bond was obtained when it was exposed to high intensity (100 milliwatts/cm$^2$) long-wavelength UV light (365 nm) with the exposure time varying from 10 to 25 seconds. Where the silicone foam spacer has been appropriately primed or treated, experiments have also shown that another suitable adhesive is the UV-/anaerobic curing acrylic adhesive Loctite Impruv TM 366.

The preferred foam spacer 20 of this example is typically manufactured from flat ¼ inch thick foam sheet extrusion which are sliced into appropriate width spacer strips. The cut-side of the foam spacer is typically located adjacent to the side of the glazing sheet 21 and because of the large surface area, the UV-curable adhesive bonds particularly well to the open-pore structure of the cut-foam side of the spacer.

In the production of the foam spacer 20, experiments have shown that where large quantities of molecular-sieve desiccant fill material are incorporated, typically between 25 to 50 percent by weight, the structural properties of the silicon-foam extrusion are significantly modified and in particular, the foam spacer exhibits superior tensile-strength properties.

For structural-glazing applications, advantage can be taken of these enhanced structural properties and the silicone foam spacer can be bonded to the glazing sheets with a durable UV-curable adhesive which is typically silicone. The combination of foam spacer and structural UV-curable adhesive can safely hold the exterior glazing sheet in position without the need for exterior glazing stops. To provide an adequate safety factor for structural glazing applications, the adhesive structural bond between the spacer and glazing panes should be characterized by a tensile strength of at least 60 psi. For structural-glazing applications, an alternative preferred spacer design is to use a solid desiccant-filled silicone extrusion.

The UV-curable adhesive can be applied in different ways using different production strategies.

Figure 2A:
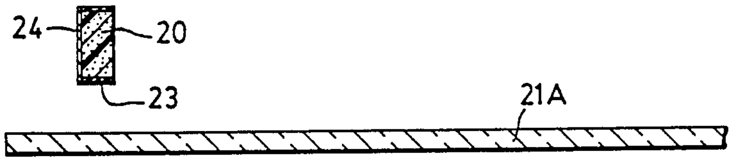
FIGS. 2A, 2B and 2C show the production steps in the fabrication of a double-glazed sealed unit where UV-curable adhesive is applied to the spacer sides.
Figure 2B:
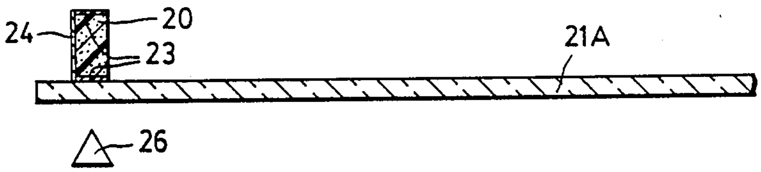
Figure 2C:
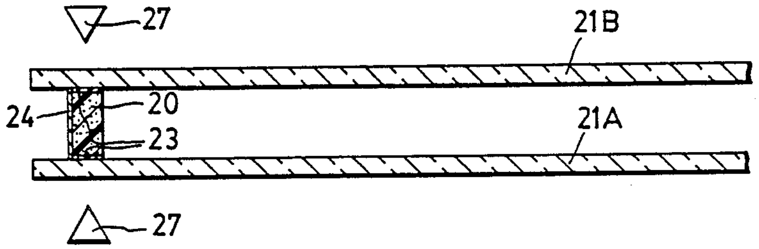

As shown in FIGS. 2A, 2B and 2C, the UV-curable adhesive 23 can be preapplied to the spacer sides. The spacer is laid down around the perimeter of the first glazing sheet 21A and is at least temporarily held or tacked in position by using a small moveable and focused source of UV light 26 which cures the UV-curable adhesive sufficiently that the spacer 20 is held in position. As with conventional practice, the second glazing sheet 21B is matched to the first glazing sheet and the glazing sandwich is then further exposed to high intensity UV light 27 from both sides of the glass to fully cure the adhesive 23.

Figure 3A:
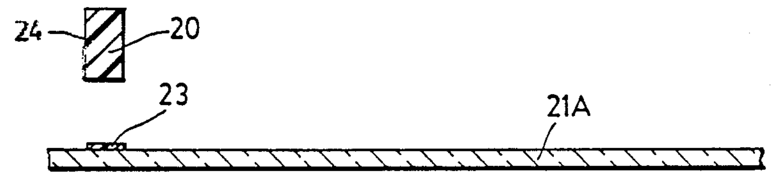
FIGS. 3A, 3B and 3C show the production steps in the fabrication of a double-glazed, sealed unit where UV-curable adhesive is applied to the perimeter of the glass sheets.
Figure 3B:
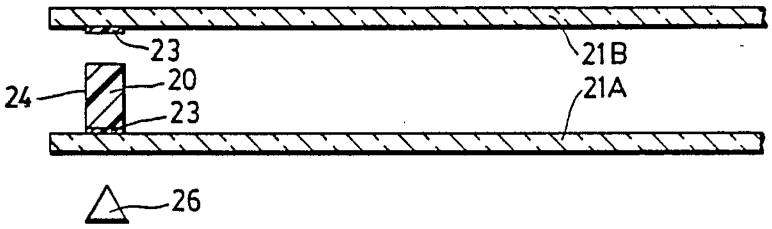
Figure 3C:
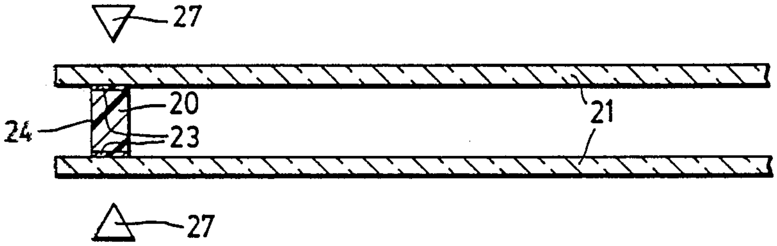

As shown in FIGS. 3A, 3B and 3C, an alternative approach is to pre-apply the UV-curable adhesive 23 to the glass sheets 21 in the appropriate location before applying the spacer 20 around the perimeter of the first glazing sheet 21A. As the spacer 20 is laid down on the glazing sheet 21A, the UV-curable adhesive 23 is at least partially cured using a moveable and focused UV light source 26. The second glazing sheet 21B also with preapplied UV-curable adhesive 23 around the perimeter is matched to first glazing sheet 21A and the glazing sandwich is then exposed on both sides to high-intensity UV light 27 to fully cure the adhesive 23.

Figure 4:
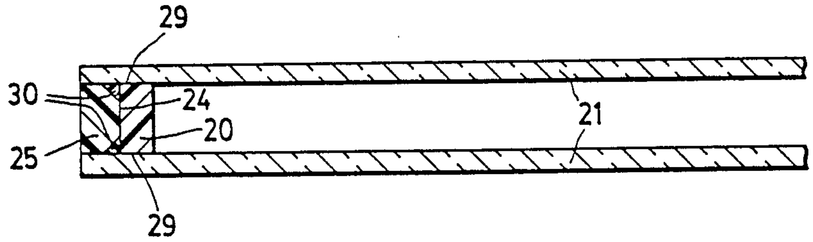
FIG. 4 shows a cross-section through the edge of a double-glazed unit with a bead of UV-curable adhesive/sealant applied at the outward/facing junctions between the spacer and glazing sheets.

As shown in FIG. 4, an alternative production strategy suitable for fast production, is to apply the foam spacer 20 using pressure-sensitive adhesive 29 and then to apply a small bead of UV-curable adhesive 30 at the outward-facing junctions between the spacer 20 and glazing sheets 21. The pressure-sensitive adhesive 29 on the spacer sides holds the glazing sheets in position during fabrication. The UV-curable adhesive bead 30 is then cured through exposure to a UV light source. As with the other production strategies. the UV-curable adhesive may be applied as a continuous strip or bead or an intermittant series of spots or cleats.

Figure 5:
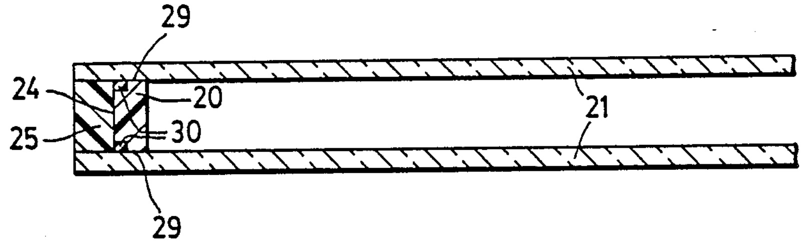
FIG. 5 shows a cross-section through the edge seal of a double-glazed unit with a combination of UV-curable adhesive and pressure-sensitive adhesive/sealant on the spacer sides.

As shown in FIG. 5, a further option is to use a combination of pressure-sensitive adhesive/sealant 29 and UV-curable adhesive 30 on the sides of the foam spacer 20. The bead of pressure-sensitive adhesive is typically located adjacent to the sealed air space and this has the advantage that any possible outgassing from the UV-curable adhesive 30 is prevented from directly entering the sealed air space.

Figure 6:
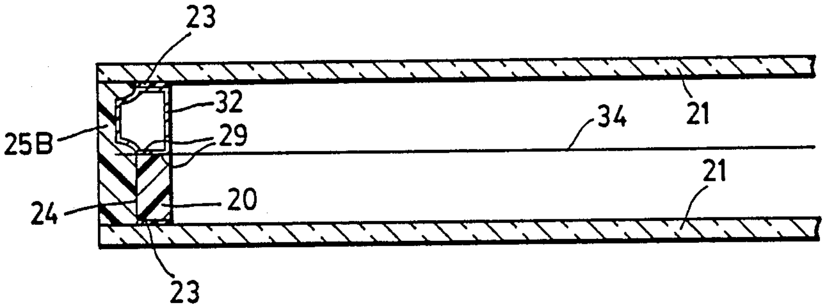
FIG. 6 shows a cross-section through a triple-glazed sealed unit incorporating a heat-shrinkable, inner glazing film with the spacers being held in position with UV-cured adhesive.

As shown in FIG. 6, there are also advantages in using the UV-curable adhesive for spacer application in sealed-glazing units incorporating heat-shrinkable plastic films. The thin flexible plastic inner film 34 is typically made from polyethylene terephthalate (PET) and is coated with a low-emissivity coating. One suitable product is manufactured by Southwall and is sold under the name of Heat Mirror. As shown in FIG. 6, both the metal spacer 32 and the foam spacer 20 are structurally adhered to the glazing sheets 21 using UV-curable adhesive 23. The film is held in position during assembly using pressure-sensitive adhesive 29.

For this application, the advantage of using UV-curable adhesive is that the potential problem of film wrinkling is essentially eliminated as the spacers are structurally held in position on the glass and cannot migrate inwards. Also, one option is for the flexible film 34 to be held in place by continuous beads of UV-curable adhesive at the outward-facing junctions of the two spacers, and for the film to be heat-tensioned prior to the application of the outer sealant. This has the advantage that the sealed units can be gas filled prior to the application of the outer sealant 25B. Also, there is the possible option of using a low-permeable thermoplastic outer sealant for reduced long-term gas loss from the sealed unit. The preferred type of adhesive for this application is a UV-curable epoxy or acrylic adhesive.

We claim:

1. In a method of manufacturing a multiple-pane sealed glazing unit wherein a first glazing pane is spaced from a second pane by a spacer, which is located around the periphery of said panes, and providing a UV-curable adhesive to connect at least part of said spacer and at least part of one pane, the improvement wherein a thin layer of said UV-curable adhesive is applied to opposite sides of said spacer and said spacer is located on at least one of said glazing sheets, and at a selected time, exposing said thin layer of adhesive to high intensity UV light so that said adhesive layer is at least partially cured.

2. In a method of manufacturing a multiple-pane sealed glazing unit wherein a first glazing pane is spaced from a second pane by a spacer which is located around the periphery of said panes and providing a UV-curable adhesive to connect at least part of said spacer and at least part of one pane, the improvement wherein a thin layer of said UV-curable adhesive is preapplied around the perimeter of said panes and as said spacer comes into mutual contact with said adhesive, exposing said adhesive layer to high intensity UV light so that said adhesive layer in contact with the spacer is at least partially cured.

3. In a method of manufacturing a multiple-pane sealed glazing unit wherein a first glazing pane is spaced from a second pane by a spacer which is located around the periphery of said panes and providing a UV-curable adhesive to connect at least part of said spacer and at least part of one pane, the improvement wherein a thin layer of said UV-curable adhesive is preapplied around the perimeter of said panes and said spacer is brought into contact with at least one pane and at a selected time exposing said adhesive layer to high intensity Uv light so that said adhesive layer is at least partially cured.

4. In a method of manufacturing a multiple-pane sealed glazing unit wherein a first glazing pane is spaced from a second pane by a spacer which is located around the periphery of said panes and providing a UV-curable adhesive to connect at least part of said spacer and at least part of one pane, the improvement wherein a combination of UV-curable adhesive and pressure sensitive adhesive is preapplied to the opposite side of said spacer adjacent to said glazing sheets and wherein said pressure adhesive temporarily holds said spacer in position, and at a selected time said UV-curable adhesive is rapidly cured through exposure to high intensity UV light.

5. In a method of manufacturing a multiple-pane sealed glazing unit wherein a first glazing pane is spaced from a second pane by a spacer which is located around the periphery of said panes and providing a UV-curable adhesive to connect at least part of said spacer and at least part of one pane, the improvement wherein said spacer is sandwiched between said panes and is temporarily held in position using pressure sensitive adhesive, and wherein beads of UV-curable adhesive are applied at the junctions between said spacer and said panes and are then rapidly cured by exposure to high intensity UV light.

6. In a method of manufacturing a multiple-pane sealed glazing unit wherein a first glazing pane is spaced from a second pane by a spacer which is located around the periphery of said panes and providing a UV-curable adhesive to connect at least part of said spacer and at least part of one pane, the improvement wherein said spacer is sandwiched between said panes and is located inwardly of the edges of the glazing panes, thereby creating an outwardly facing perimeter channel therebetween, and where after said UV-curable adhesive is rapidly cured through exposure to UV light, said outward-facing perimeter channel is filled with a low-permable thermoplastic sealant.

7. A method of claims 1, 2, 3, 4, 5 or 6 where said spacer is a flexible insulating desiccant-filled strip.

8. A method of claims 1, 2 or 3 where said spacer is a desiccant-filled, silicone foam flexible strip.

9. A method of claims 1, 2 or 3 where said spacer is a desiccant-filled, solid silicone flexible strip.

10. A method of claims 1, 2 or 3 where said spacer is a desiccant-filled, acrylic foam flexible strip.

11. A method of claim 1, or claim 2 or claim 3 where said UV-curable adhesive is an epoxy adhesive.

12. A method of claim 1, or claim 2, or claim 3 where said UV-curable adhesive is a silicone adhesive.

13. A method of claim 1, or claim 2, or claim 3 where said UV-curable adhesive is an acrylic adhesive.

14. A method of claims 1, 2, or 3 where two spacers are structurally adhered to first and second glazing panes using UV-curable adhesive and an inner flexible heat sprinkable plastic film is suspended between said panes and said spacers.

* * * * *